(12) United States Patent
Takenouchi et al.

(10) Patent No.: US 8,606,974 B2
(45) Date of Patent: Dec. 10, 2013

(54) DIRECT MEMORY ACCESS CONTROLLER

(75) Inventors: Koji Takenouchi, Kawasaki (JP); Seiji Suetake, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 12/730,801

(22) Filed: Mar. 24, 2010

(65) Prior Publication Data

US 2010/0180053 A1   Jul. 15, 2010

Related U.S. Application Data

(62) Division of application No. 11/707,988, filed on Feb. 20, 2007, now Pat. No. 7,716,390.

(30) Foreign Application Priority Data

Aug. 11, 2006   (JP) .................. 2006-220337

(51) Int. Cl.
*G06F 13/28* (2006.01)
*G06F 13/00* (2006.01)

(52) U.S. Cl.
USPC ............. 710/22; 710/23; 710/26; 710/33

(58) Field of Classification Search
USPC .............................. 710/22, 23, 26, 33
See application file for complete search history.

(56) References Cited

U.S. PATENT DOCUMENTS

| 6,453,365 | B1* | 9/2002 | Habot .................. 710/22 |
| 6,622,181 | B1* | 9/2003 | Comisky et al. ......... 710/22 |
| 6,748,463 | B1  | 6/2004 | Tsuboi et al. |
| 7,159,065 | B1  | 1/2007 | Marlatt |
| 7,386,707 | B2  | 6/2008 | Kurata et al. |
| 2002/0040415 | A1 | 4/2002 | Moteki et al. |
| 2005/0120417 | A1 | 6/2005 | Yanofsky et al. |
| 2006/0155982 | A1* | 7/2006 | Christensen et al. ......... 713/153 |

FOREIGN PATENT DOCUMENTS

| JP | 4-177445 | 6/1992 |
| JP | 4-277850 | 10/1992 |
| JP | 5-204833 | 8/1993 |
| JP | 2000-99452 | 4/2000 |
| JP | 2002-278915 | 9/2002 |
| JP | 2005-165508 | 6/2005 |

OTHER PUBLICATIONS

Japanese Office Action issued May 10, 2011 in corresponding Japanese Patent Application 2006-220337.
Notice of Allowance mailed Mar. 29, 2010 in corresponding U.S. Appl. No. 11/707,988.

(Continued)

*Primary Examiner* — Farley Abad
(74) *Attorney, Agent, or Firm* — Staas & Halsey LLP

(57) ABSTRACT

A direct memory access controller is provided, in which an internal storage section storing control setting information; and a control section loading the control setting information from an external storage section to the internal storage section when a transfer request signal does not belong to a first group, and not loading the control setting information from the external storage section to the internal storage section when the transfer request signal belongs to the first group; are included, and a data transfer by a direct memory access is performed in accordance with the control setting information within the internal storage section.

4 Claims, 7 Drawing Sheets

(56) References Cited

OTHER PUBLICATIONS

Notice of Allowance mailed Dec. 28, 2009 in corresponding U.S. Appl. No. 11/707,988.

Office Action mailed Jul. 21, 2009 in corresponding U.S. Appl. No. 11/707,988.
Office Action mailed Jan. 7, 2009 in corresponding U.S. Appl. No. 11/707,988.

* cited by examiner

DIRECT MEMORY ACCESS CONTROLLER

CROSS-REFERENCE TO RELATED APPLICATIONS

This application is a divisional of U.S. Ser. No. 11/707,988, filed Feb. 20, 2007, now U.S. Pat. No. 7,716,390, which is based upon and claims the benefit of priority from the prior Japanese Patent Application No. 2006-220337, filed on Aug. 11, 2006, the entire contents of both of which are incorporated herein by reference.

BACKGROUND OF THE INVENTION

1. Field of the Invention

The present invention relates to a direct memory access controller performing a data transfer by using a direct memory access.

2. Description of the Related Art

FIG. 2 is a view showing a configuration example of a direct memory access controller (DMAC) 101 and an external memory 102. The DMAC 101 has a control setting register 211, a transfer destination address setting register 212, a transfer source address setting register 213, a resource enable register 214, an interrupt factor register 215, a descriptor start address setting register 216, a status register 217, and a counter 221. The external memory 102 stores a descriptor 204. The descriptor 204 includes a control setting register 201, a transfer destination address setting register 202, and a transfer source address setting register 203 by each channel number.

Transfer request signals REQ are inputted to the DMAC 101 from plural resources respectively having channel numbers, and the DMAC 101 loads control setting information, a transfer destination address, and a transfer source address from the control setting register 201, the transfer destination address setting register 202, and the transfer source address setting register 203 inside of the external memory 102 corresponding to the channel number, to the control setting register 211, the transfer destination address setting register 212, and the transfer source address setting register 213 inside of the DMAC 101. The external memory 102 stores the control setting information, the transfer destination address, and the transfer source address by each channel number, and the DMAC 101 performs the load of the above from the external memory 102 to the DMAC 101 every time when the channel number of the transfer request signal REQ changes.

A descriptor control system is described in Patent Document 1 stated below, in which a DMAC is connected to an external storage area via a bus, the external storage area includes a descriptor, and the DMAC is controlled by using the descriptor.

Besides, a data transfer device is described in Patent Document 2 stated below, in which a direct memory access transfer is performed in accordance with plural descriptors continuously set in an external storage area beforehand.

[Patent Document 1] Japanese Patent Application Laid-open No. Hei 4-277850
[Patent Document 2] Japanese Patent Application Laid-open No. Hei 4-177445

In the DMAC 101 of the descriptor control system, there is a problem in which a setting of the descriptor 204 must be loaded from the external memory 102 when the transfer request signal REQ of another channel number is generated even if a setting value is the same.

SUMMARY OF THE INVENTION

An object of the present invention is to provide a direct memory access controller capable of shortening a setting time of control setting information.

According to an aspect of the present invention, a direct memory access controller is provided, including: an internal storage section storing control setting information; and a control section loading the control setting information from an external storage section to the internal storage section when a transfer request signal does not belong to a first group, and not loading the control setting information from the external storage section to the internal storage section when the transfer request signal belongs to the first group, and wherein a data transfer by a direct memory access is performed in accordance with the control setting information within the internal storage section.

DETAILED DESCRIPTION OF THE PREFERRED EMBODIMENTS

—First Embodiment—

Figure 1:
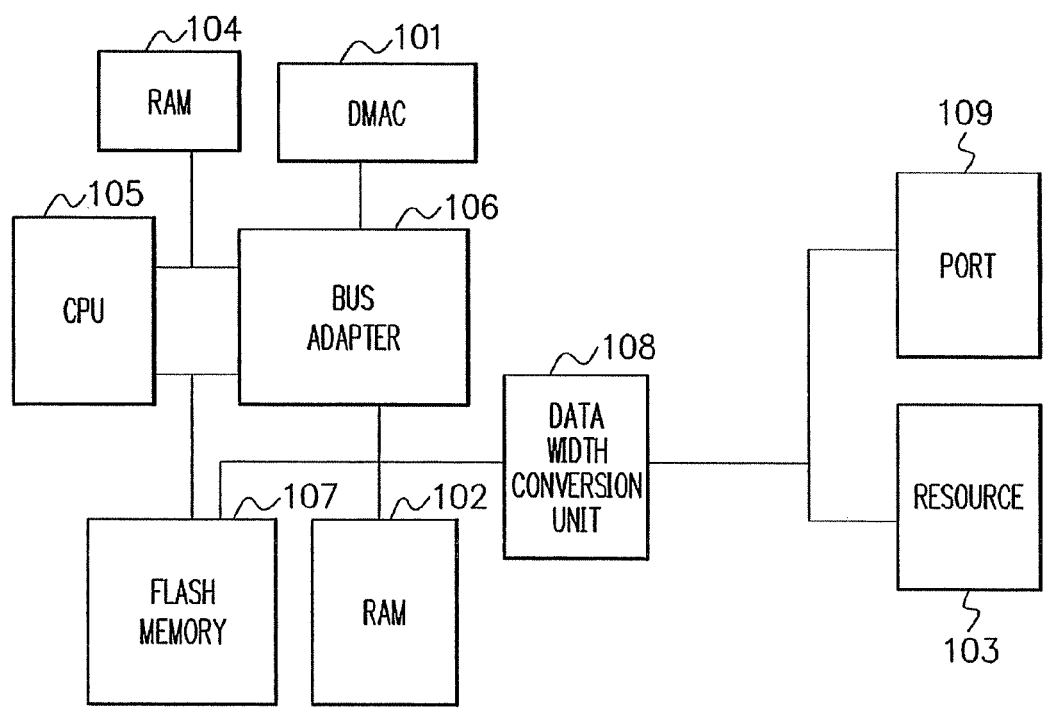
FIG. 1 is a block diagram showing a configuration example of a semiconductor chip of a semiconductor integrated circuit according to a first embodiment of the present invention.

FIG. 1 is a block diagram showing a configuration example of a semiconductor chip of a semiconductor integrated circuit according to a first embodiment of the present invention. A direct memory access controller (DMAC) 101, a RAM 104, a CPU 105, a flash memory 107, a RAM 102, and a data width conversion unit 108 are connected to a bus adapter 106 via buses. The bus adapter 106 controls a timing of the above-stated units via the buses. A resource 103 and a port 109 are connected to the data width conversion unit 108. The data width conversion unit 108 performs a conversion of a data width. The port 109 is an external terminal of this semiconductor chip. The resource 103 is a peripheral device such as a timer or an A/D converter. The DMAC 101 controls a data transfer between the resource 103 and the RAM 102 and so on by a direct memory access without being intervened by the CPU 105 when a transfer request signal is inputted from the resource 103.

Figure 3:
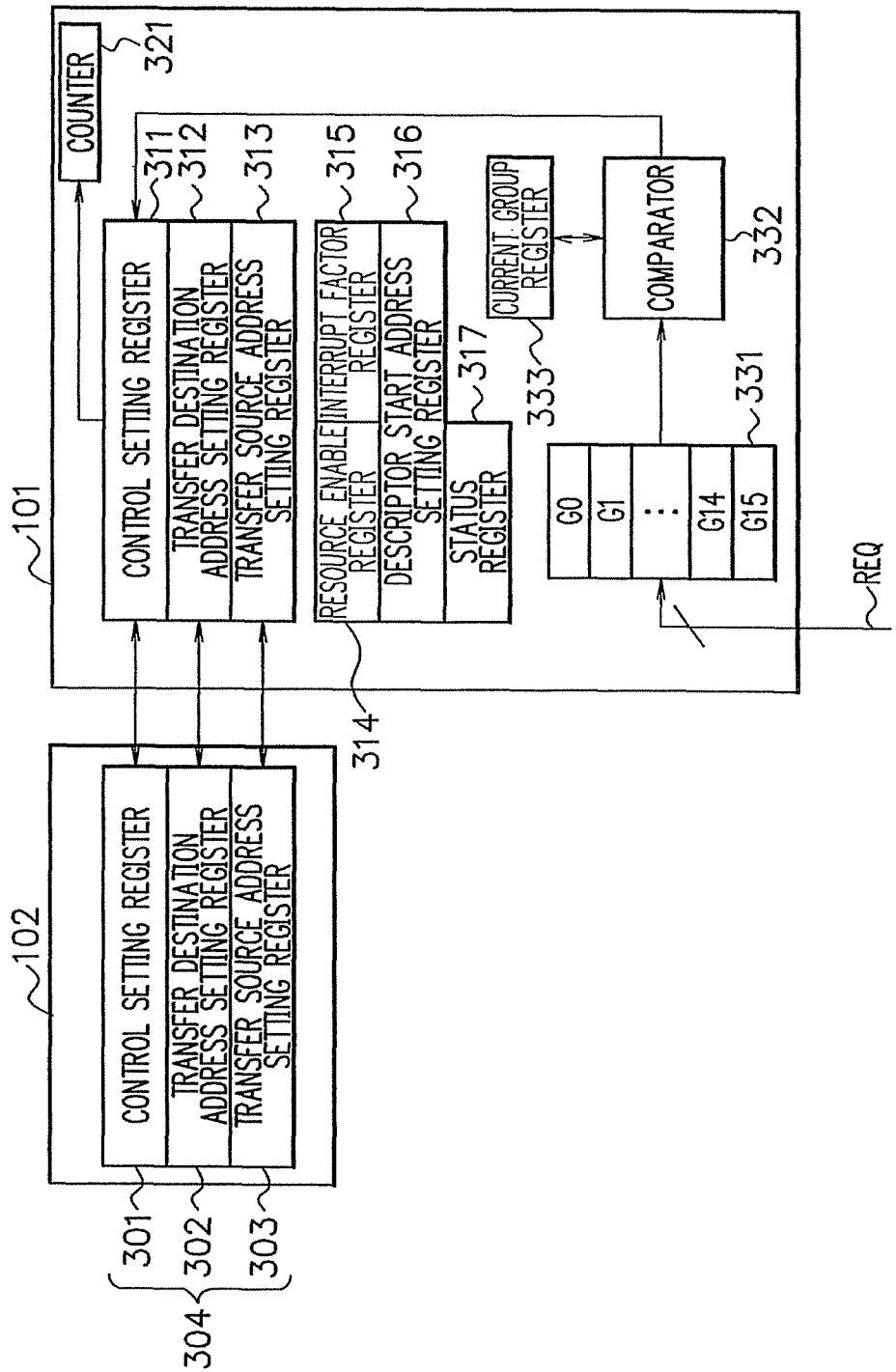
FIG. 3 is a view showing a configuration example of a DMAC and an external memory according to the first embodiment of the present invention.

FIG. 3 is a view showing a configuration example of a DMAC 101 and a RAM (external memory) 102 according to the present embodiment. The DMAC 101 has a control setting register 311, a transfer destination address setting register 312, a transfer source address setting register 313, a resource enable register 314, an interrupt factor register 315, a descriptor start address setting register 316, a status register 317, a counter 321, a group setting section 331, a comparator 332, and a current group register 333. The external memory 102 stores a descriptor 304. The descriptor 304 includes a control setting register 301, a transfer destination address setting register 302, and a transfer source address setting register 303 by each channel number.

A transfer request signal REQ is a signal inputted from the resource 103 (FIG. 1) to the DMAC 101, and for example, it is a digital signal of 16 bits. For example, there exist 16 resources 103, and each of the 16 resources 103 is connected to the DMAC 101 via one transfer request signal line. The number of lines of the transfer request signal REQ becomes 16 as a total, and it becomes a 16-bit line. In each resource 103, a transfer request comes to be an enable state by making the transfer request signal REQ high level, and the transfer request comes to be a disable state by making the transfer request signal REQ low level. Channel numbers of "0" (zero) to "15" are respectively supplied to the 16 resources 103. The transfer request signal REQ of 16 bits corresponds to the transfer request signals of the channel numbers of "0" (zero) to "15". For example, the external memory 102 corresponds to 16 channels, and stores 16 sets of the control setting registers 301, the transfer destination address setting registers 302, and the transfer source address setting registers 303. Namely, the control setting register 301, the transfer destination address setting register 302, and the transfer source address setting register 303 are provided by each channel number.

The control setting registers 301 and 311 store the control setting information of 32 bits. The control setting information includes the number of times of transfer, a transfer data length, or the number of wait cycles between the respective transfers. The transfer data length is a data length of one transfer, and for example, it is a byte or a word. The number of times of transfer within the control setting register 311 is loaded on the counter 321. The counter 321 decrements a count value every time when the transfer is performed, and completes the transfer when the count value becomes "0" (zero). The DMAC 101 performs the data transfer between the resource 103 and the external memory 102 and so on in accordance with the number of times of transfer, the transfer data length, and the number of wait cycles between the respective transfers and so on within the control setting register 301. The control setting register 301, the transfer destination address setting register 302, and the transfer source address setting register 303 are an external storage section inside of the external memory 102. The control setting register 311, the transfer destination address setting register 312, and the transfer source address setting register 313 are an internal storage section inside of the DMAC 101.

The transfer destination setting registers 302 and 312 store a transfer destination address of 32 bits. The transfer source setting registers 303 and 313 store a transfer source address of 32 bits. For example, when the data transfer is performed from the resource 103 to the external memory 102, the transfer source address is an address of the resource 103 and the transfer destination address is an address of the external memory 102. On the contrary, when the data transfer is performed from the external memory 102 to the resource 103, the transfer source address is the address of the external memory 102, and the transfer destination address is the address of the resource 103.

The resource enable register 314 stores the enable states of the transfer requests of the resources 103 of the respective channel numbers. The descriptor start address setting register 316 stores a start address of the descriptor 304 inside of the external memory 102. The status register 317 stores a status of, for example, a completion status and so on of the data transfer.

The transfer request signal REQ is inputted to the group setting section 331, and the group setting section 331 sets a group in accordance with the channel number. The groups to which the respective channel numbers of "0" (zero) to "15" are belonging are stored in group setting registers G0 (zero) to G15. For example, when the transfer request signal REQ with the channel number of "0" (zero) is inputted, the group in the group setting register G0 (zero) is outputted to the comparator 332. There is a case when the control setting information is the same even if the channel numbers are different. In such a case, these channel numbers are to belong to the same group. The 16 group setting registers G0 (zero) to G15 respectively store the group numbers of four bits (0 (zero) to 15).

The current group register 333 stores a group number of five bits, and "16" (the number other than 0 (zero) to 15) is stored as an initial value. After it is compared at the comparator 332, a new group number is overwritten to the current group register 333. Namely, the current group register 333 stores the group of the previous transfer request signal REQ as the current group.

The comparator 332 is a comparator with five bits, and compares the group number outputted by the group setting section 331 and the group number stored in the current group register 333. When a comparison result is different, the comparator 332 controls such that the control setting information is loaded from the control setting register 301 inside of the external memory 102 to the control setting register 311 inside of the DMAC 101 via the bus. When the comparison result is the same, the comparator 332 outputs a control signal not to access the control setting register 301 inside of the external memory 102 to maintain the control setting information within the control setting register 311. The initial value of the current group register 333 is set such that the comparison result of the comparator 332 is surely to be different when the first transfer request signal REQ is inputted. Namely, when the group numbers which can be outputted by the group setting section 331 are from "0" (zero) to "15", the initial value of the current group register 333 is set as "16" or more. Accordingly, the control setting information is surely loaded from the control setting register 301 inside of the external memory 102 to the control setting register 311 inside of the DMAC 101 at the initial time. After the above-stated comparison, the group number outputted from the group setting section 331 is stored in the current group register 333.

As stated above, the transfer request having the channel number belonging to the same group number has the same control setting information. When a new transfer request signal REQ is inputted, and a group number thereof and the current group number are the same, the control setting information within the control setting register 311 is maintained because it is not necessary to change the information. On the contrary, when the new transfer request signal REQ is inputted, and the group number thereof and the current group number are different, the control setting information is loaded from the control setting register 301 inside of the external memory 102 to the control setting register 311 inside of the DMAC 101, because it is necessary to change the control setting information within the control setting register 311.

Figure 2:
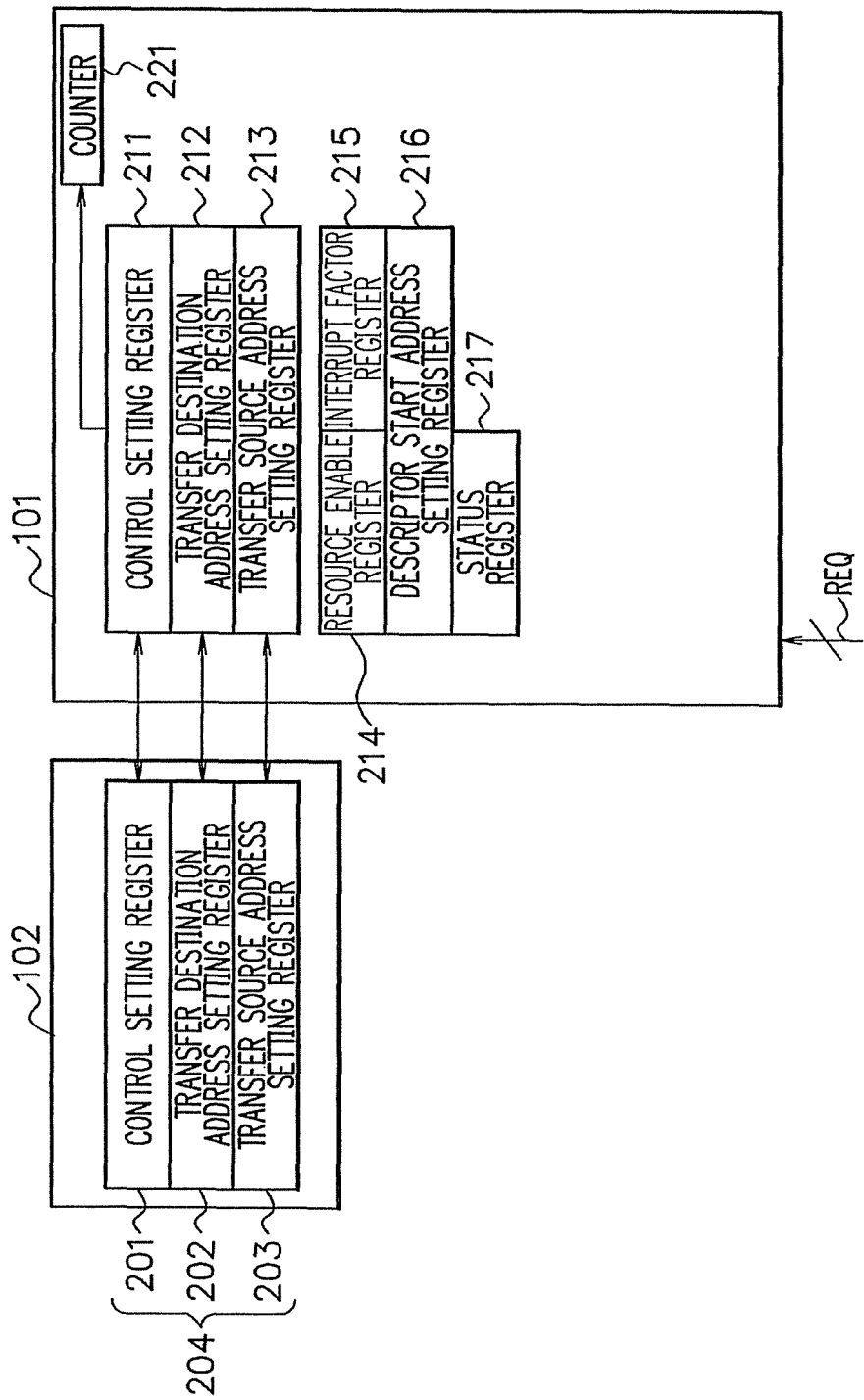
FIG. 2 is a view showing a configuration example of a direct memory access controller (DMAC) and an external memory.

In the present embodiment, it is possible to eliminate the number of times of loading the control setting information from the external memory 102 to the DMAC 101 compared to the DMAC shown in FIG. 2, and therefore, a setting time of the control setting information can be shortened.

Figure 6:
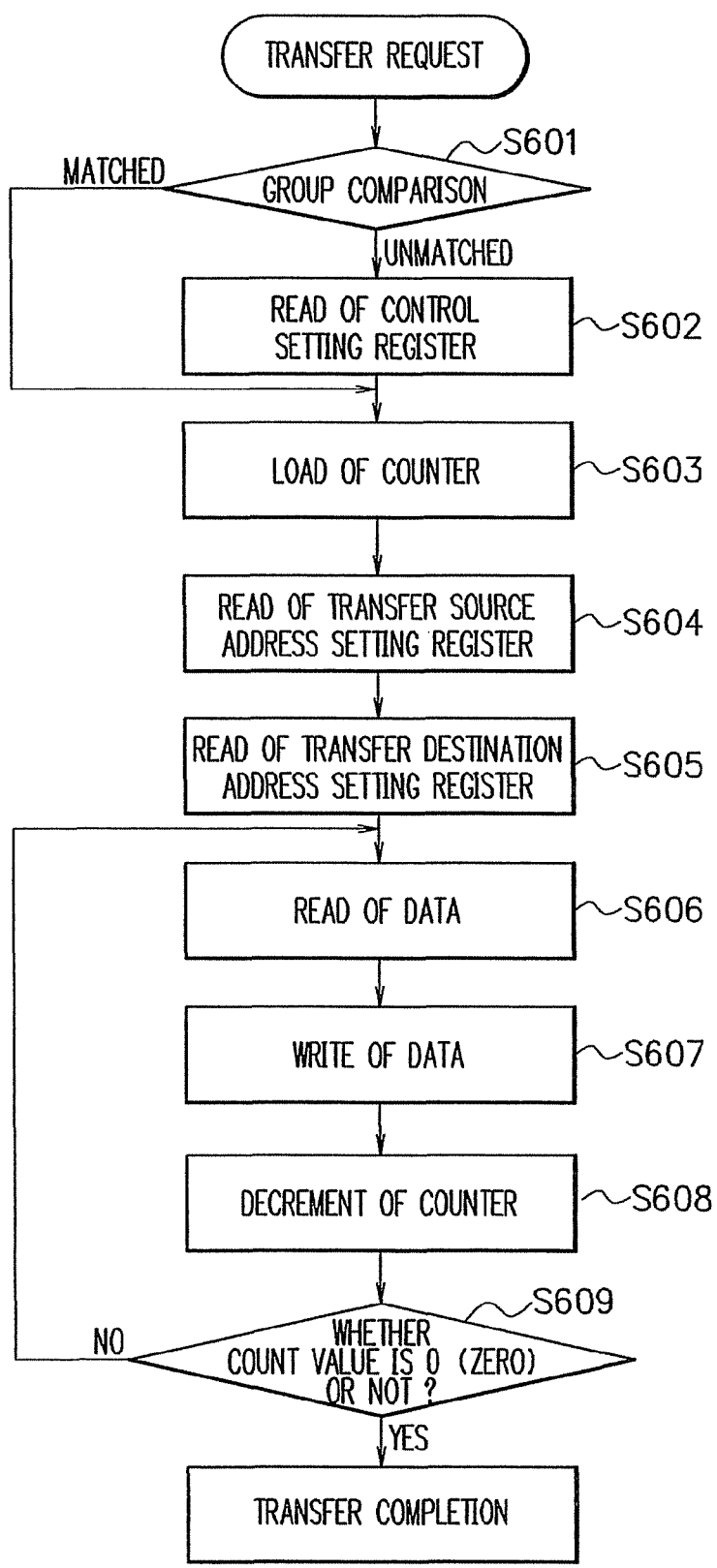
FIG. 6 is a flow chart showing a process example of the DMAC in FIG. 3.

FIG. 6 is a flow chart showing a process example of the DMAC 101 in FIG. 3. When the transfer request signal REQ inputted to the DMAC 101 from the resource 103 is in the enable state, the DMAC 101 starts the following processes. The group setting section 331 sets the group number in accordance with the channel number of the transfer request signal REQ, to output to the comparator 332.

The comparator 332 compares the group number outputted by the group setting section 331 and the group number stored in the current group register 333 at the step S601. When both values are not matched, the process goes to the step S602, the control setting information is loaded from the control setting register 301 inside of the external memory 102 to the control setting register 311 inside of the DMAC 101, and the process goes to the step S603. When the both values are matched, the above-stated loading is not performed, the control setting information within the control setting register 311 inside of the DMAC 101 is maintained, and the process goes to the step S603.

At the step S603, the DMAC 101 loads the number of times of transfer within the control setting register 311 to the counter 321, to set the value as the count value. Next, the DMAC 101 loads (reads) the transfer source address from the transfer source address setting register 303 inside of the external memory 102 to the transfer source address setting register 313 inside of the DMAC 101 at the step S604. Next, the DMAC 101 loads (reads) the transfer destination address from the transfer destination address setting register 302 inside of the external memory 102 to the transfer destination address setting register 312 inside of the DMAC 101 at the step S605.

Next, the DMAC 101 reads a data from an address shown by the transfer source address register 313 at the step S606. For example, the DMAC 101 reads the data from the resource 103. Next, the DMAC 101 writes the data which is read as stated above to the address shown by the transfer destination address register 312 at the step S607. For example, the DMAC 101 writes the data to the external memory 102. As stated above, the data transfer by the direct memory access is performed.

Next, the DMAC 101 decrements the count value of the counter 321 at the step S608. Next, the DMAC 101 checks up if the count value of the counter 321 is "0" (zero) or not at the step S609. When the value is not "0" (zero), the process goes back to the step S606, and the DMAC 101 repeats the data transfer. When the count value of the counter 321 becomes "0" (zero) at the step S609, the data transfer process is completed. As stated above, the DMAC 101 repeats the data transfer for the number of times of transfer set in the counter 321 at the step S603.

As stated above, it becomes possible to eliminate the total number of times of access for an extent that there is no need to access the external memory 102 when the group number comparison results match.

Figure 7:
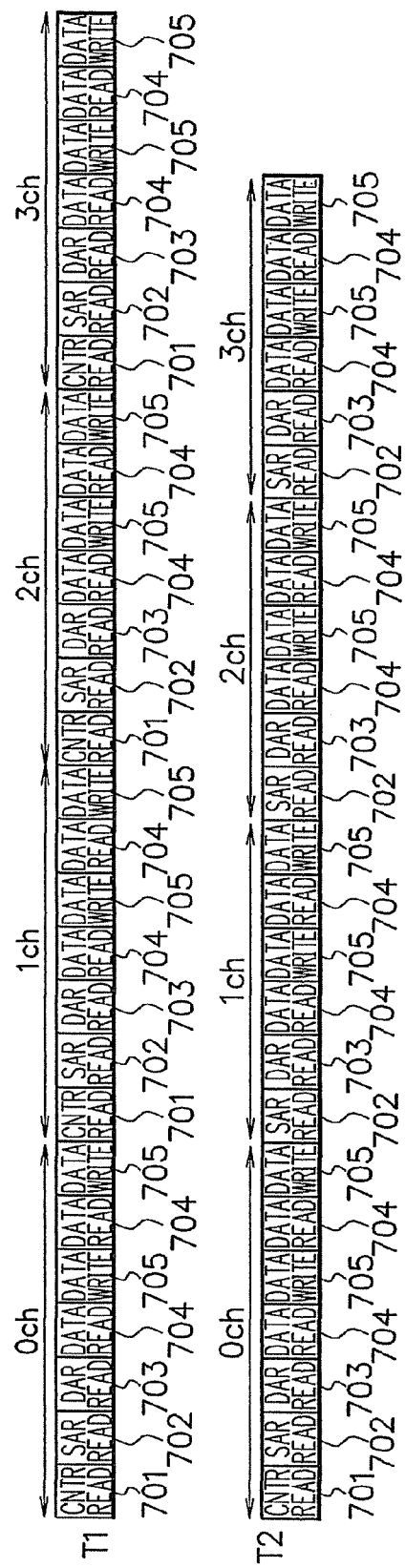
FIG. 7 is a time chart showing a comparison of the number of times of an access process of the DMAC in FIG. 2 and the access process of the DMAC in FIG. 3.

FIG. 7 is a time chart showing a comparison of the number of times of access process of the DMAC in FIG. 2 and the access process of the DMAC in FIG. 3. A horizontal axis shows a time. An access process T1 shows the access process of the DMAC in FIG. 2. An access process T2 shows the access process of the DMAC in FIG. 3 of the present embodiment. An example is shown in which the data transfers are performed sequentially in accordance with the transfer request signals REQ with four channel numbers of 0ch (zero) to 3ch. A case is described as an example when all of the four channel numbers 0ch (zero) to 3ch have the same control setting information.

A control setting information load (read) process 701 corresponds to the process of the step S602 in FIG. 6. A transfer source address load (read) process 702 corresponds to the process of the step S604 in FIG. 6. A transfer destination address load (read) process 703 corresponds to the process of the step S605 in FIG. 6. A data read process 704 corresponds to the step S606 in FIG. 6. A data write process 705 corresponds to the step S607 in FIG. 6.

In the access process T1 of the DMAC in FIG. 2, the control setting information load (read) process 701 is performed every time when the process of each channel number is performed. On the contrary, in the access process T2 of the DMAC in the present embodiment, the control setting information load (read) process 701 is performed only for the first channel number 0ch (zero) and the control setting information load (read) process 701 is not performed for the subsequent channel numbers 1ch to 3ch, because the control setting information is the same when the channel numbers 0ch (zero) to 3ch belong to the same group. Accordingly, it is possible to eliminate the number of times of the control setting information load (read) processes 701 and to shorten the data transfer time in the access process T2 of the DMAC of the present embodiment compared to the access process T1 of the DMAC in FIG. 2. Incidentally, the more a program (data transfer amount) becomes compact, the larger an elimination ratio of the number of accesses becomes with all things considered, and it can be said to be effective.

As stated above, the control section (comparator) 332 loads the control setting information from the external control setting register (external storage section) 301 to the internal control setting register (internal storage section) 311 when the transfer request signal REQ does not belong to a first group, and does not load the control setting information from the external control setting register 301 to the internal control setting register 311 when the transfer request signal REQ belongs to the first group.

Concretely, the control section 332 loads the control setting information from the external control setting register 301 to the internal control setting register 311 when the transfer request signal REQ does not belong to the first group, and maintains the control setting information within the internal control setting register 311 when the transfer request signal REQ belongs to the first group.

The DMAC 101 performs the data transfer by the direct memory access in accordance with the control setting information within the internal control setting register 311.

—Second Embodiment—

Figure 4:
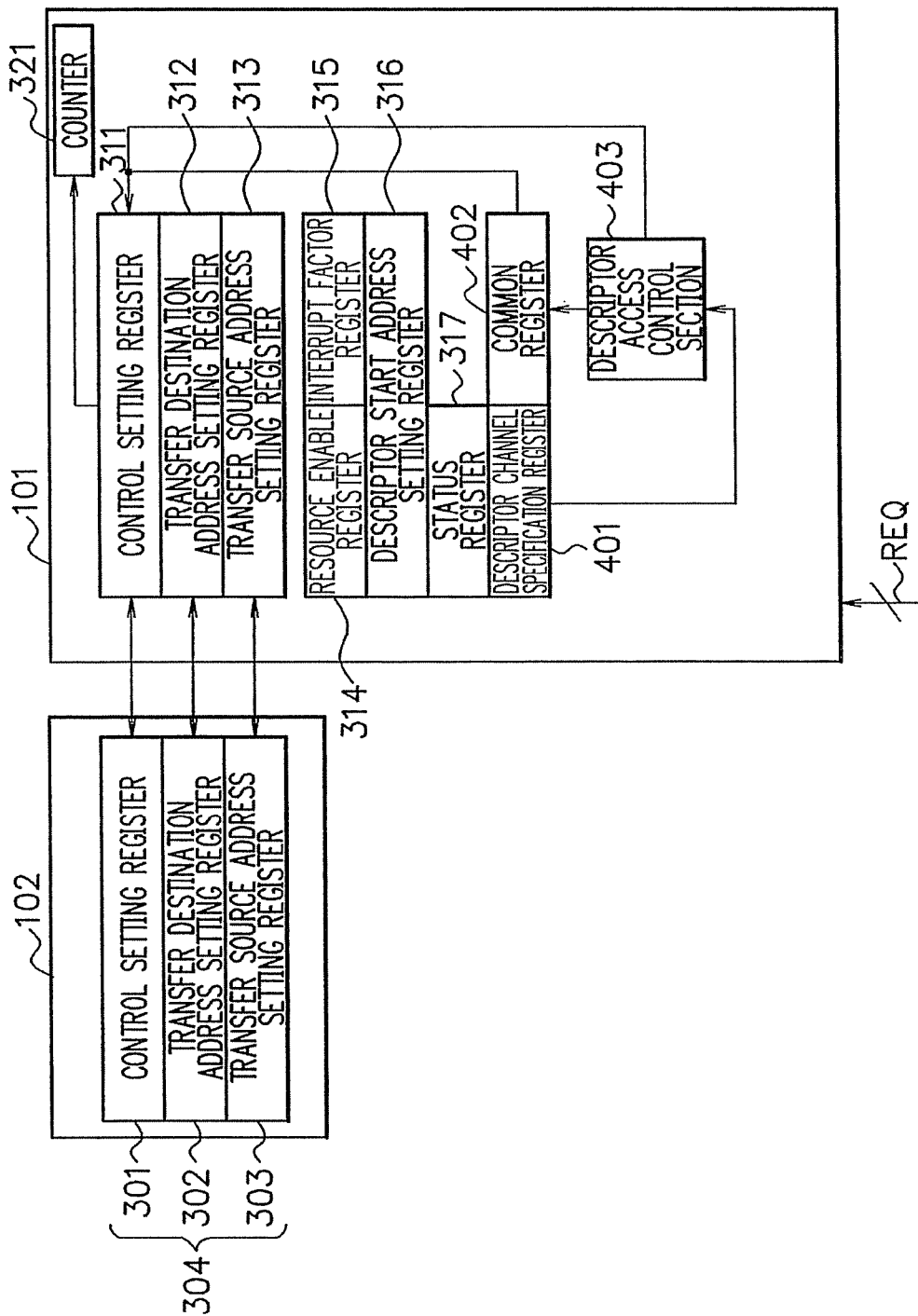
FIG. 4 is a view showing a configuration example of a DMAC and an external memory according to a second embodiment of the present invention.

FIG. 4 is a view showing a configuration example of a DMAC 101 and an external memory 102 according to a second embodiment of the present invention. In the present embodiment (FIG. 4), the group setting section 331, the comparator 332, and the current group register 333 are deleted and a descriptor channel specification register 401, a common register 402, and a descriptor access control section 403 are added from/to the first embodiment (FIG. 3). Hereinafter, different points of the present embodiment from the first embodiment are described.

Figure 5:
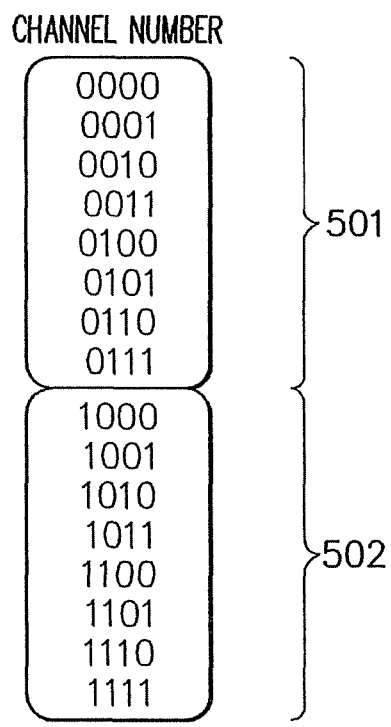
FIG. 5 is a view showing an example in which 16 channel numbers are expressed by a four-bit expression.

When 16 lines of transfer request signal REQ is inputted to the DMAC 101, the DMAC 101 converts channel numbers of the 16 lines of transfer request signal REQ into four-bit channel numbers, to store in the descriptor channel specification register 401. As shown in FIG. 5, it is possible to express 16 channel numbers by the four-bit channel numbers.

FIG. 5 is a view showing an example in which the 16 channel numbers are expressed in four-bit. These channel numbers of four bits are stored in the descriptor channel specification register 401. For example, a fourth bit being a most significant bit of the channel number is noticed. A first group 501 is a group in which the fourth bit of the channel number is "0" (zero), and a second group 502 is a group in which the fourth bit of the channel number is "1". All of the channel numbers belong to the group 502 have same control setting information. Accordingly, the control setting information common to the channel numbers belong to the group 502 is stored in the common register (common control setting information storage section) 402 in FIG. 4. The common register 402 is preferable to be a nonvolatile memory.

The descriptor access control section 403 outputs an access signal to a control setting register 301 inside of the external memory 102 to load the control setting information from the control setting register 301 inside of the external memory 102 to a control setting register 311 inside of the DMAC 101, when the fourth bit of the channel number within the descriptor channel specification register 401 is "0" (zero). On the contrary, the descriptor access control section 403 outputs a control signal not to access the control setting register 301 inside of the external memory 102 to load the control setting information from the common register 402 inside of the DMAC 101 to the control setting register 311 inside of the DMAC 101, when the fourth bit of the channel number within the descriptor channel specification register 401 is "1".

The DMAC 101 accesses the external memory 102 via a bus, and therefore, it takes a long time to load the control setting information from the external memory 102 to the DMAC 101. On the contrary, it takes a short time for the DMAC 101 to load the control setting information from the internal common register 402 to the control setting register 311. When there are plural resources 103 and so on of which control setting information are common, it becomes possible to reduce the number of times of access to the external memory 102 by assigning the channel number of which fourth bit is "1". As a result, a data transfer time by a direct memory access can be shortened and a transfer effect improves.

As stated above, the descriptor access control section 403 loads the control setting information from the external control setting register 301 to the internal control setting register 311 when the transfer request signal REQ belongs to the first group 501, and loads the control setting information from the common register 402 to the control setting register 311 when the transfer request signal REQ does not belong to the first group 501, according to the present embodiment.

Concretely, the descriptor access control section 403 loads the control setting information from the external control setting register 301 to the internal control setting register 311, or loads the control setting information from the common register 402 to the control setting register 311, in accordance with one bit (for example, the fourth bit) from among the channel number of plural bits shown by the transfer request signal REQ.

As stated above, it is possible to shorten the setting time of the control setting information because the number of times to load the control setting information from the external control setting register 301 to the internal control setting register 311 can be reduced according to the first and second embodiments. As a result, the data transfer time by the direct memory access can be shortened.

The setting time of the control setting information can be shortened because the number of times to load the control setting information from the external storage section to the internal storage section can be eliminated. As a result, the data transfer time by the direct memory access can be shortened.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A direct memory access controller comprising:
an internal storage section configured to store control setting information;
a common control setting information storage section configured to store the control setting information; and
a control section configured to load the control setting information from an external storage section to the internal storage section when a transfer request signal does not belong to a first group, and to load the control setting information from the common control setting information storage section to the internal storage section when the transfer request signal belongs to the first group, and
wherein the control section loads the control setting information from the external storage section to the internal storage section, or loads the control setting information from the common control setting information storage section to the internal storage section, in accordance with one bit from among a channel number of plural bits shown by the transfer request signal.

2. The direct memory access controller according to claim 1, wherein the control section loads the control setting information from the external storage section via a bus.

3. The direct memory access controller according to claim 1, wherein the control setting information includes the number of times of transfer, a transfer data length, or the number of wait cycles between respective transfers.

4. The direct memory access controller according to claim 1, wherein the control setting information includes the number of times of transfer, and the direct memory access controller further comprising:
a counter to which the number of times of transfer is loaded from the internal storage section.

* * * * *